(12) United States Patent
Kawashima et al.

(10) Patent No.: US 7,163,411 B2
(45) Date of Patent: Jan. 16, 2007

(54) TERMINAL PROTECTIVE DEVICE FOR COMPRESSOR, COMPRESSOR AND COLD STORAGE CHAMBER

(75) Inventors: Uehito Kawashima, Gunma (JP);
Katsuyuki Takeda, Gunma (JP);
Masahide Kobayashi, Saitama (JP);
Noboru Onodera, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 429 days.

(21) Appl. No.: 10/783,653

(22) Filed: Feb. 19, 2004

(65) Prior Publication Data
US 2004/0179966 A1 Sep. 16, 2004

(30) Foreign Application Priority Data
Mar. 10, 2003 (JP) .............................. 2003-063420
Nov. 21, 2003 (JP) .............................. 2003-391746

(51) Int. Cl.
*H01R 13/44* (2006.01)

(52) U.S. Cl. ........................ 439/135; 439/521; 439/893

(58) Field of Classification Search ................ 439/134, 439/135, 521, 892, 893; 174/138 F
See application file for complete search history.

(56) References Cited

U.S. PATENT DOCUMENTS

| 5,067,907 A * | 11/1991 | Shotey ........................ 439/135 |
| 6,457,843 B1 * | 10/2002 | Kester et al. ................ 362/276 |
| 2003/0012669 A1 * | 1/2003 | Kawashima et al. ..... 417/423.1 |

* cited by examiner

*Primary Examiner*—Tho D. Ta
(74) *Attorney, Agent, or Firm*—Darby & Darby

(57) ABSTRACT

There is here disclosed a terminal protective device for a compressor to which a terminal cover can be attached and held stably. The terminal protective device comprises a terminal fence fixed to the outer surface of a hermetically sealed vessel so as to surround a terminal attached to the hermetically sealed vessel, and a terminal cover attached to the terminal fence so as to cover the terminal. The terminal cover has the shape of a substantially rectangular box and is held on its upper or lower surface as well as right and left surfaces by the terminal fence.

5 Claims, 14 Drawing Sheets

TERMINAL PROTECTIVE DEVICE FOR COMPRESSOR, COMPRESSOR AND COLD STORAGE CHAMBER

BACKGROUND OF THE INVENTION

The present invention relates to a terminal protective device for protecting a terminal attached to a hermetically sealed vessel of a compressor, the compressor provided with the same, and a cold storage chamber.

A compressor constituting a freezer for a cold storage chamber or the like conventionally comprises a hermetically sealed vessel, and an electric element, a compression element, etc. disposed in this hermetically sealed vessel, and on the outer surface of this hermetically sealed vessel, there is provided a terminal which is used for power feeding to the electric element and for operation control of the same. Since this terminal is provided with an overload relay, a starting relay, etc., and it functions as a charging portion, the terminal is required to be protected with a resin terminal cover (see Japanese Patent Application Laid-open No. 121485/1994, for example).

In this case, a terminal fence made of a steel plate is attached to the hermetically sealed vessel around the terminal, and the terminal cover is held by this terminal fence to cover the terminal, the respective relays, etc. in the above state. However, the terminal cover is conventionally held only at its upper and lower portions by the terminal fence, which causes the problem that the terminal cover is easily removed owing to vibration even if it is fixed with clips or the like.

SUMMARY OF THE INVENTION

The present invention has been developed in order to solve such a conventional technical problem, and an object of the present invention is to provide a terminal protective device for a compressor to which a terminal cover can be attached and held stably, a compressor provided with the same, and a cold storage chamber.

A terminal protective device for a compressor of the present invention comprises a terminal fence fixed to the outer surface of a hermetically sealed vessel so as to surround a terminal attached to the hermetically sealed vessel; and a terminal cover attached to the terminal fence so as to cover the terminal, wherein the terminal cover has the shape of a substantially rectangular box and it is held on its upper or lower surface as well as right and left surfaces by the terminal fence. Therefore, the terminal cover can be held firmly and stably. The terminal cover has the shape of the substantially rectangular box, and is therefore easily molded and is also miniaturized.

Moreover, in the terminal protective device for the compressor of the present invention, the terminal fence comprises a holding piece positioned on the opposite sides of the terminal to hold the terminal cover; and a receiving piece which is positioned below the terminal and on which the terminal cover is laid. Since the projecting dimension of the receiving piece from the hermetically sealed vessel is larger than that of the holding piece, the terminal cover is easily laid on the holding piece when attached to the terminal fence, and the attaching operation properties of the terminal cover are enhanced.

Furthermore, in the terminal protective device for the compressor of the present invention, the holding piece comprises an engagement hole, and the terminal cover comprises a plurality of engaging protrusions which detachably engage with the engagement hole on opposite side surfaces. Moreover, the engaging protrusion positioned in the vicinity of the middle of the side surface of the terminal cover is set to be higher than the other engaging protrusion. Therefore, even when the side surface of the terminal cover in the vicinity of the middle falls inwards at the time of molding, the engaging protrusion can be engaged with/attached to the engagement hole of the holding piece of the terminal fence securely and stably.

Additionally, in the terminal protective device for the compressor of the present invention, the terminal cover comprises attachment guide portions positioned on the opposite sides of the receiving piece, the tip corner portion of the receiving piece of the terminal fence is formed in a curved shape, and the dimension of the attachment guide portion is set to be shorter than the right/left surface dimension of the receiving piece. Therefore, when the terminal cover is removed from the terminal fence, the terminal cover can be deformed and detached easily.

Moreover, in the terminal protective device for the compressor of the present invention, the terminal cover comprises a lead wire drawing portion, and the lead wire drawing portion is cut out/formed so as to be gradually narrowed from an open side on a terminal fence side, and is partially covered with the terminal fence in a state in which the terminal cover is held by the terminal fence. Therefore, lead wires drawn out of the terminal cover are easily inserted via a broad opening in the lead wire drawing portion on the open side, and can be collected and arranged together in a narrow portion. Since the lead wire drawing portion is partially covered with the terminal fence, it is possible to avoid a disadvantage that the charging portion is touched by fingers.

Furthermore, in the terminal protective device for the compressor of the present invention, since the terminal fence integrally includes an earth terminal positioned in an empty space in the terminal cover, the empty space in the terminal cover can be used to take an earth, and the terminal cover is miniaturized. Moreover, since the earth terminal is integral with the terminal fence, the number of components can be reduced.

Additionally, since the compressor of the present invention is provided with the terminal cover of the terminal protective device of each invention described above, safety, and assembly and maintenance operation properties are enhanced.

Moreover, since a cold storage chamber of the present invention is provided with the compressor, the safety and the assembly and maintenance operation properties are similarly enhanced.

DETAILED DESCRIPTION OF THE PREFERRED EMBODIMENT

Figure 1:
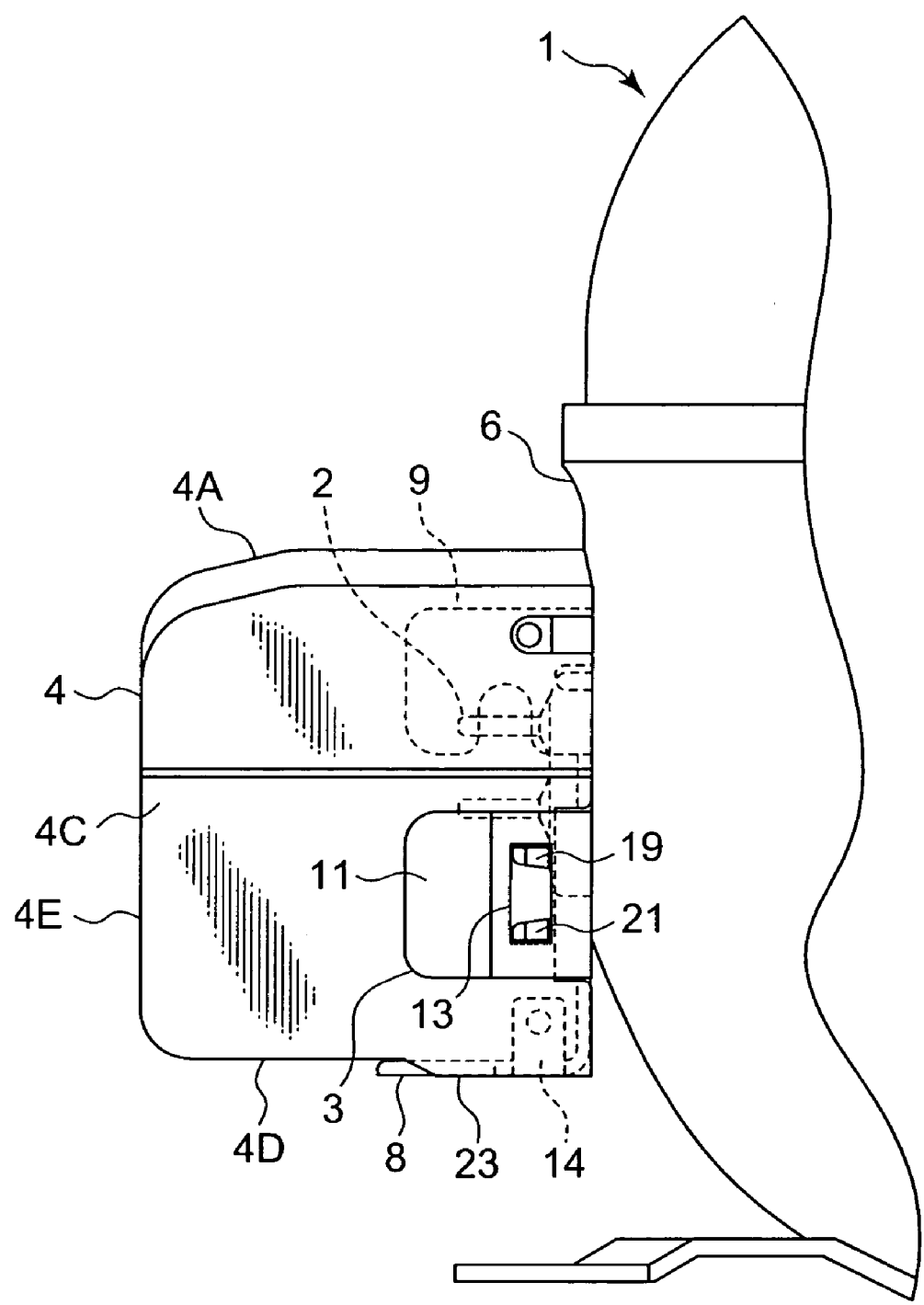
FIG. 1 is a front view of a terminal, terminal fence, and terminal cover portion to which the present invention is applied.
Figure 2:
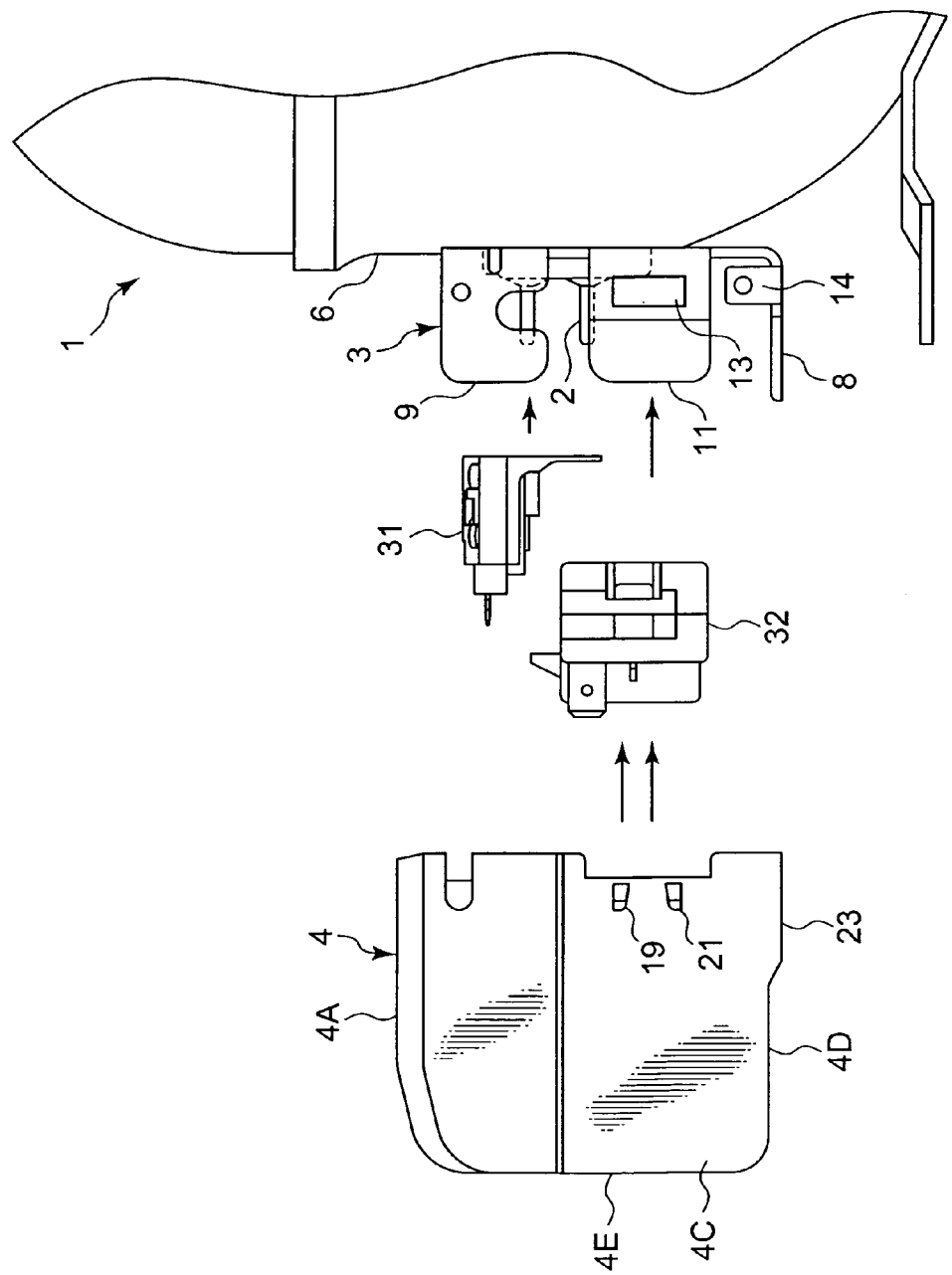
FIG. 2 is an exploded view of FIG. 1.

An embodiment of the present invention will hereinafter be described in detail with reference to the drawings. FIG. 1 is a front view of a terminal 2, a terminal fence 3, and a terminal cover 4 portion of a compressor 1 to which a terminal protective device of the present invention is applied, and FIG. 2 is an exploded view of FIG. 1. The compressor 1 constitutes a refrigerator for household/business use or a cooler for cold storage chambers such as a low-temperature showcase, and is a reciprocating, rotary or scroll type compressor including a hermetically sealed vessel 6, and an electric element (not shown) and a compression element driven by the electric element which are disposed in the hermetically sealed vessel 6. The terminal 2 for feeding a power to the electric element to control operation is attached to the outer surface of the hermetically sealed vessel 6 and extended through the hermetically sealed vessel 6.

Figure 6:
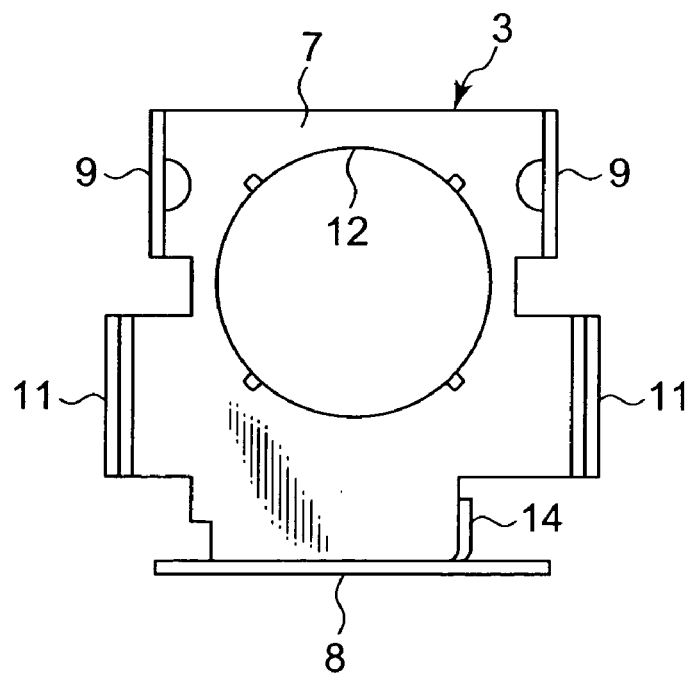
FIG. 6 is a front view of the terminal fence of FIG. 1.
Figure 7:
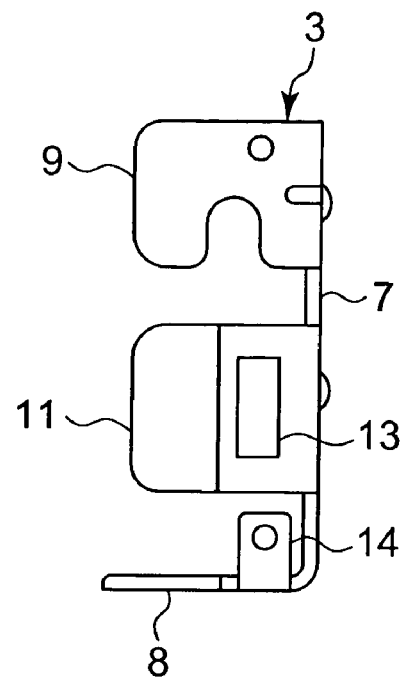
FIG. 7 is a side view of the terminal fence of FIG. 1.
Figure 8:
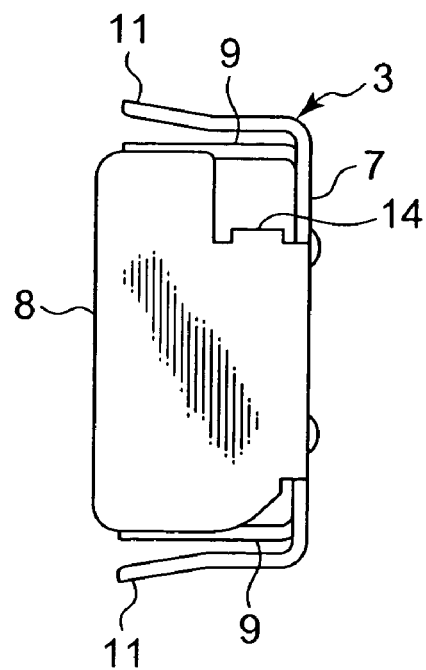
FIG. 8 is a bottom view of the terminal fence of FIG. 1.

Reference numeral 3 denotes the terminal fence welded/fixed to the outer surface of the hermetically sealed vessel 6 so as to surround the terminal 2. The terminal fence 3 is formed by bending/processing a flat steel plate. As shown in FIGS. 6 to 8, the terminal fence comprises: a base portion 7 fixed to the hermetically sealed vessel 6; a receiving piece 8 formed by bending the lower edge of the base portion 7 substantially at right angles; upper holding pieces 9, 9 formed by similarly bending upper right and left ends of the base portion 7 substantially at right angles; and lower holding pieces 11, 11 formed by similarly bending middle right and left portions of the base portion 7 substantially at right angles. It is to be noted that reference numeral 12 denotes a round hole opposite to which the terminal 2 is to be disposed.

Figure 15:
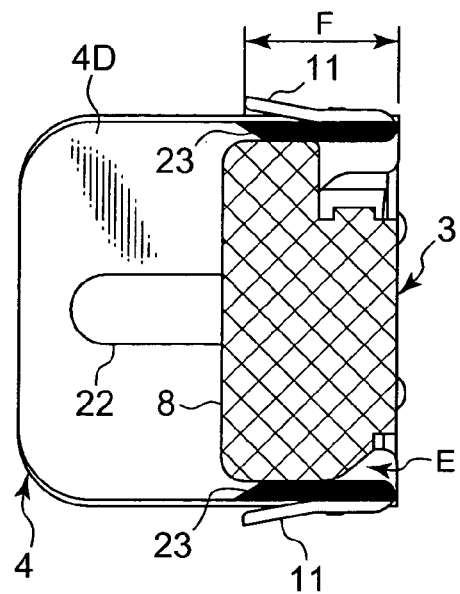
FIG. 15 is another bottom view showing that the terminal cover is attached to the terminal fence of FIG. 1.

In this case, the upper holding pieces 9, 9 are positioned in upper right and left corners of the terminal fence, and the lower holding pieces 11, 11 are disposed outside the upper holding pieces 9, 9. Tip portions of the lower holding pieces 11, 11 are obliquely bent outwardly (right/left direction) so as to gradually open wide, and a rectangular engagement hole 13 is formed on a base portion 7 side from the opened portion. The receiving piece 8 has a projecting dimension (C in FIG. 18) from the hermetically sealed vessel 6, which is set to be larger than that (D in FIG. 18) of the upper and lower holding pieces 9, 9, 11, 11, and has opposite tip corners in shapes curved at a predetermined curvature. An earth terminal 14 is substantially perpendicularly cut and raised and integrally formed on the right side of the base of the receiving piece 8 (on the base portion 7 side). Furthermore, the receiving piece 8 has an obliquely inward hollowed shape on the left side of the base (shown by E of FIG. 15).

Figure 3:
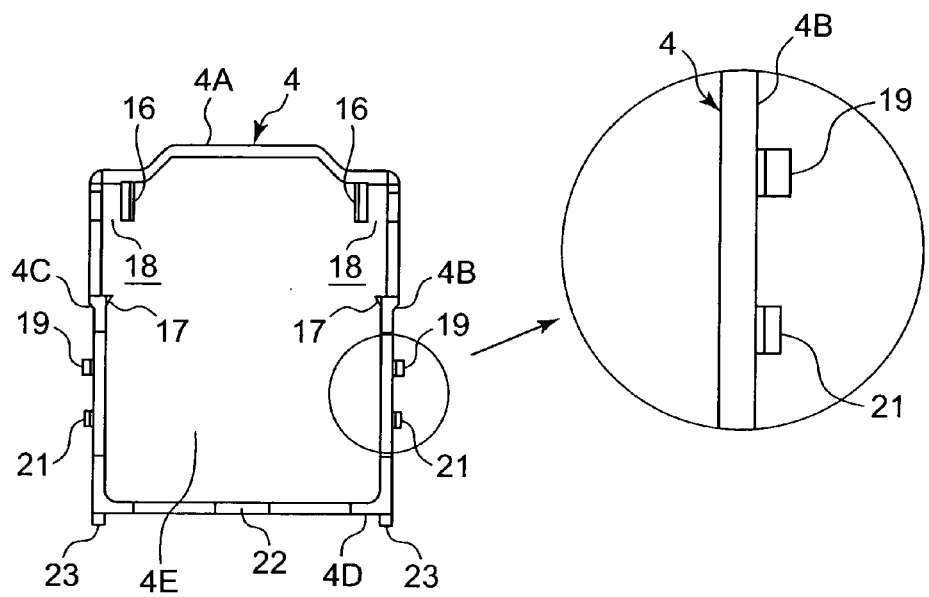
FIG. 3 is a front view of a terminal cover of FIG. 1.
Figure 4:
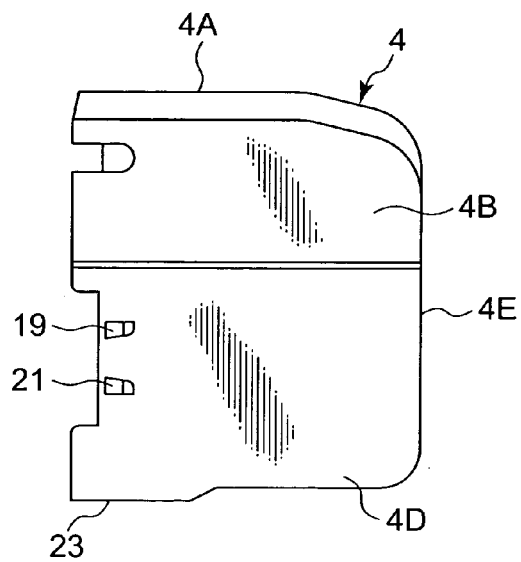
FIG. 4 is a side view of the terminal cover of FIG. 1.
Figure 5:
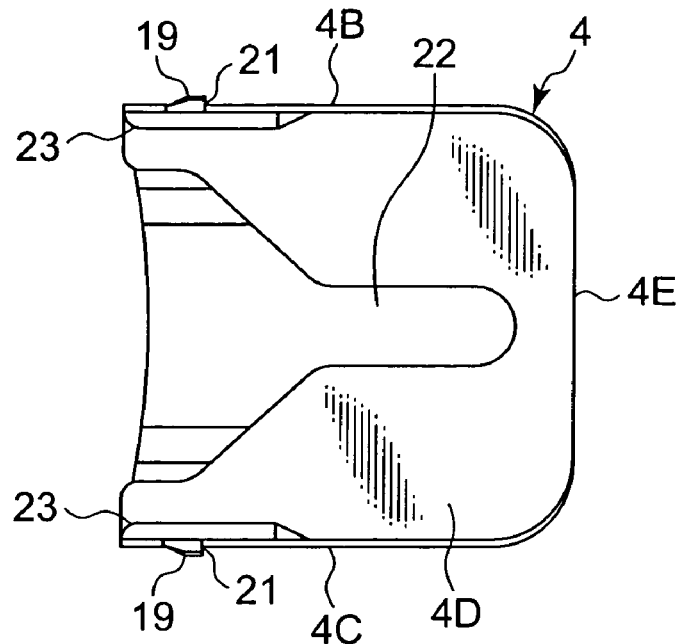
FIG. 5 is a bottom view of the terminal cover of FIG. 1.

On the other hand, the terminal cover 4 is constituted of a hard synthetic resin, and has the shape of a substantially rectangular box having one open end as shown in FIGS. 3 to 5. In the terminal cover 4, protrusions 16, 16 are integrally formed on right and left portions of the lower surface of an upper wall 4A at a predetermined dimension from the inner surface of an inner wall 4E in an opening direction, and protrusions 17, 17 are integrally formed on the inner surfaces of right and left side walls 4B, 4C of the terminal cover 4 below the protrusions 16, 16. These protrusions 16, 17 constitute insertion portions 18, 18 in upper right and left corners in the terminal cover 4.

Moreover, engaging protrusions 19, 19 are integrally projected/formed in the vicinity of middles of the outer surfaces of the opposite side walls 4B, 4C of the terminal cover 4, and engaging protrusions 21, 21 are also integrally formed below the respective engaging protrusions 19, 19. Moreover, the engaging protrusion 19 has a height set to be greater than that of the engaging protrusion 21 (in the right circle of FIG. 3). It is to be noted that the respective engaging protrusions 19, 19, 21, 21 have inclined shapes such that the protrusions are gradually lowered on an opening side. A lead wire drawing portion 22 is cut/formed in a bottom wall 4D of the terminal cover 4 on the opening side. The lead wire drawing portion 22 substantially has a Y-shape which is broad on the opening side and whose right and left portions are substantially equally inclined and gradually narrowed in a direction of the inner wall 4E (FIG. 5).

Furthermore, attachment guide portions 23, 23 are projected/formed in a predetermined dimensional range on the opening side on right and left ends of the bottom wall 4D of the terminal cover 4. The dimensions (F of FIG. 15) of the attachment guide portions 23, 23 are set to be shorter than those of the right and left surfaces of the receiving piece 8 of the terminal fence 3.

Figure 12:
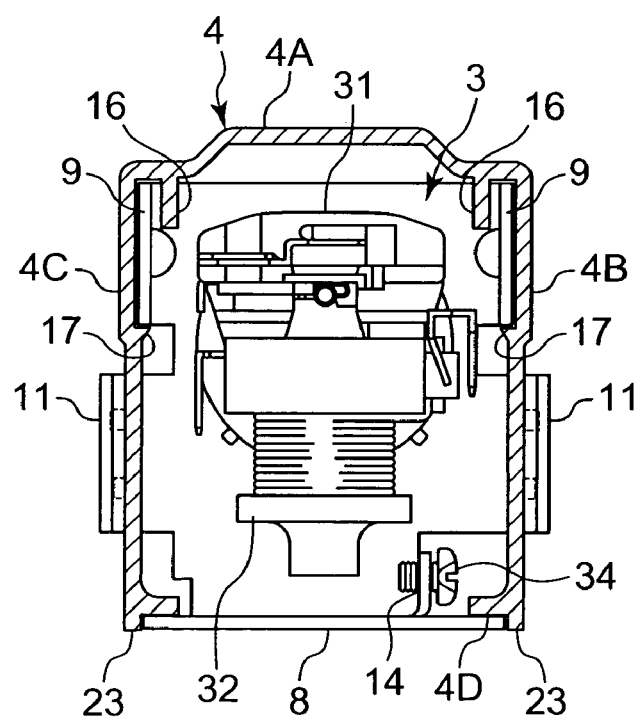
FIG. 12 is a longitudinal front view showing that the terminal cover is attached to the terminal fence of FIG. 1.
Figure 13:
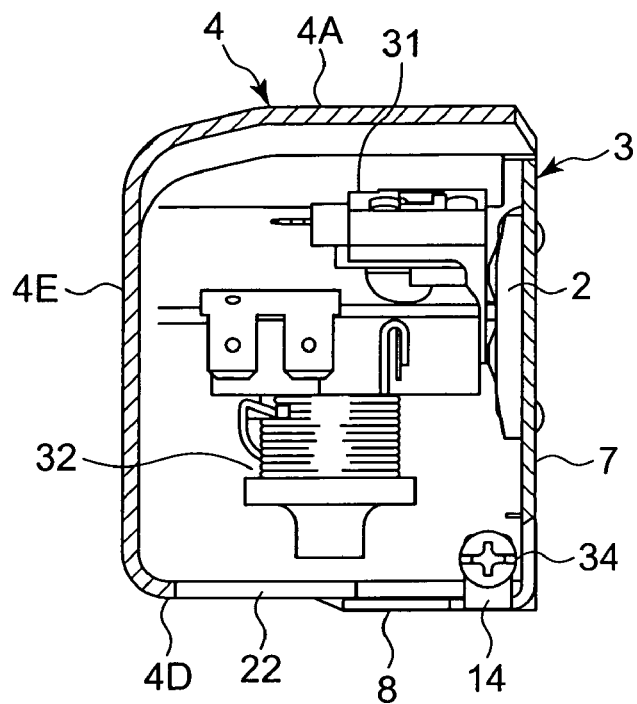
FIG. 13 is a longitudinal side view showing that the terminal cover is attached to the terminal fence of FIG. 1.
Figure 16:
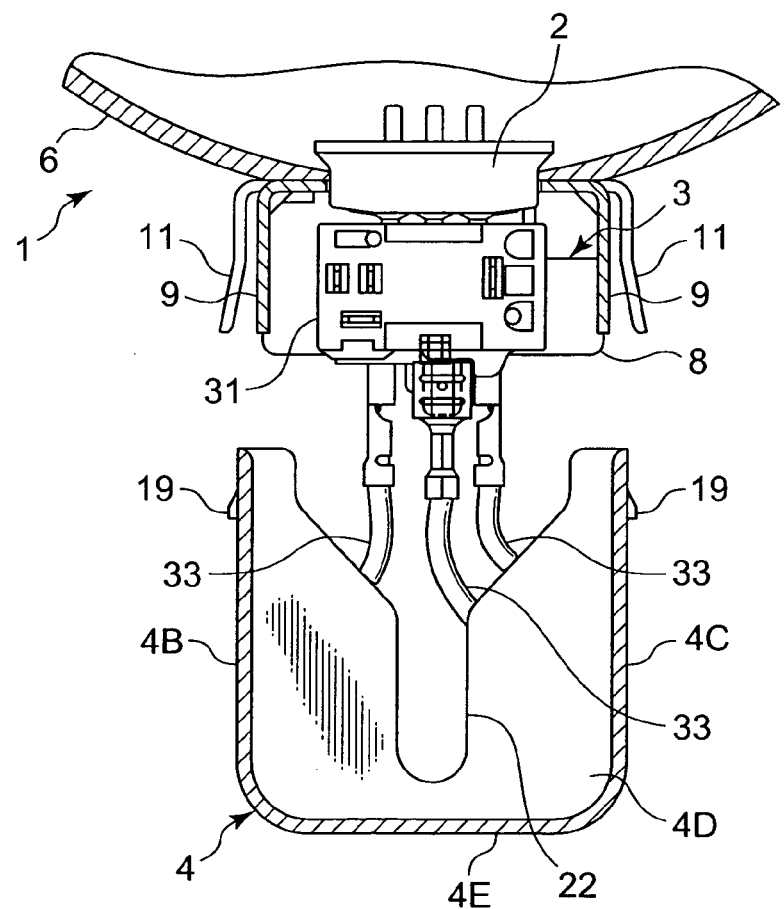
FIG. 16 is a flat sectional view showing a procedure for attaching the terminal cover to the terminal fence of FIG. 1.
Figure 18:
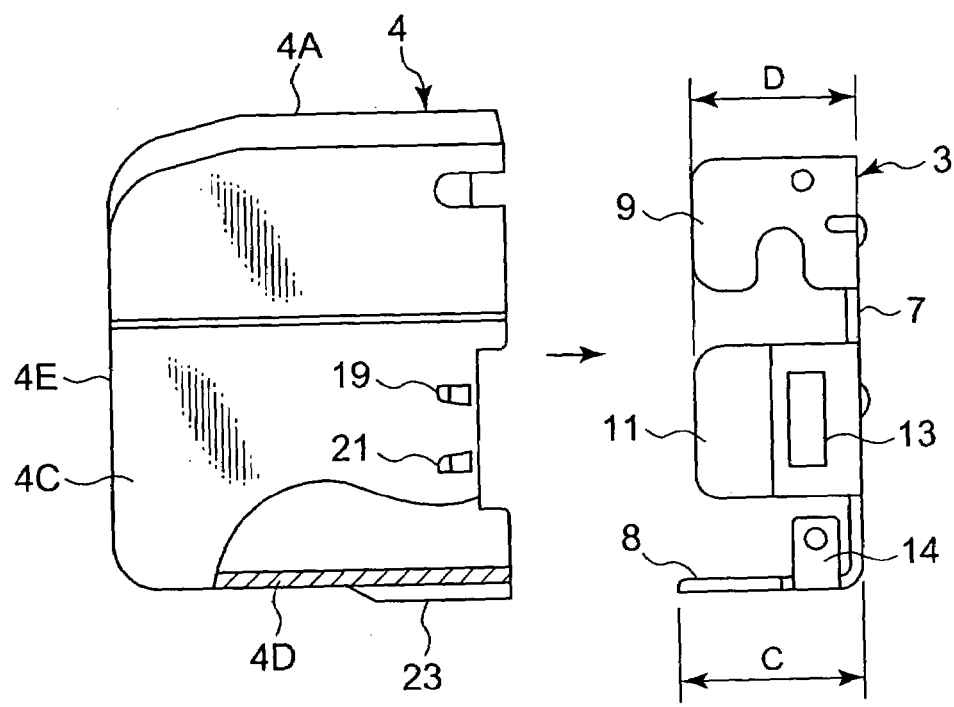
FIG. 18 is a side view showing the procedure for attaching the terminal cover to the terminal fence of FIG. 1.
Figure 19:
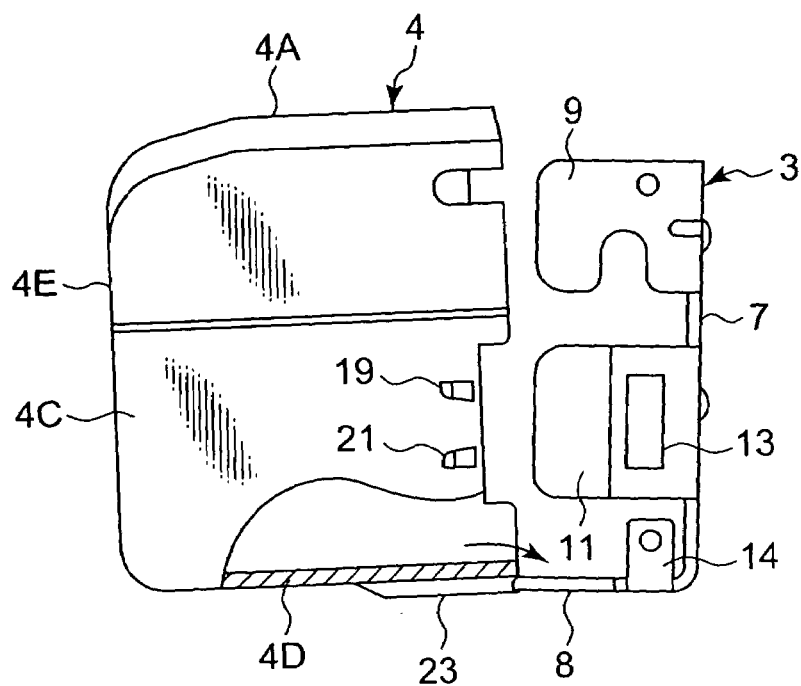
FIG. 19 is another side view showing the procedure for attaching the terminal cover to the terminal fence of FIG. 1.

Next, a procedure for attaching the terminal cover 4 to the terminal fence 3 in the above-described constitution will be described. First, as shown in FIG. 2, an overload relay 31 or a starting relay 32 is attached to the terminal 2. In this state, the overload relay 31 is positioned in an upper part inside the terminal fence 3, and the starting relay 32 is positioned in a lower part inside the terminal fence 3 (FIGS. 12, 13). Moreover, while a plurality of lead wires 33 extending from the overload relay 31 and starting relay 32 hang downward from the tip of the receiving piece 8 of the terminal fence 3, the opening of the terminal cover 4 is disposed opposite to the terminal fence 3 as shown in FIGS. 18, 16, and the portions of the bottom wall 4D on the opposite sides of the lead wire drawing portion 22 are laid on the receiving piece 8 of the terminal fence 3 as shown in FIG. 19.

At this time, since the projecting dimension of the receiving piece 8 is set to be large as compared with the right and left holding pieces 9, 9, 11, 11 (shown by C and D in FIG. 18), the bottom wall 4D of the terminal cover 4 is easily laid. The attachment guide portions 23, 23 of the terminal cover 4 are positioned on the opposite ends of the receiving piece 8 so as to position the cover, and also fulfills a function of guiding the cover so that the cover is subsequently easily slid on a hermetically sealed vessel 6 side.

Figure 9:
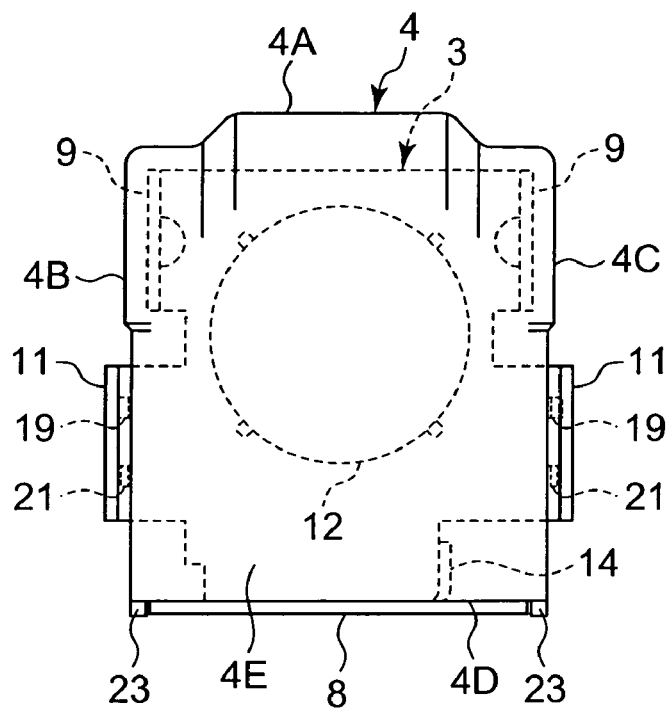
FIG. 9 is a front view showing that the terminal cover is attached to the terminal fence of FIG. 1.
Figure 10:
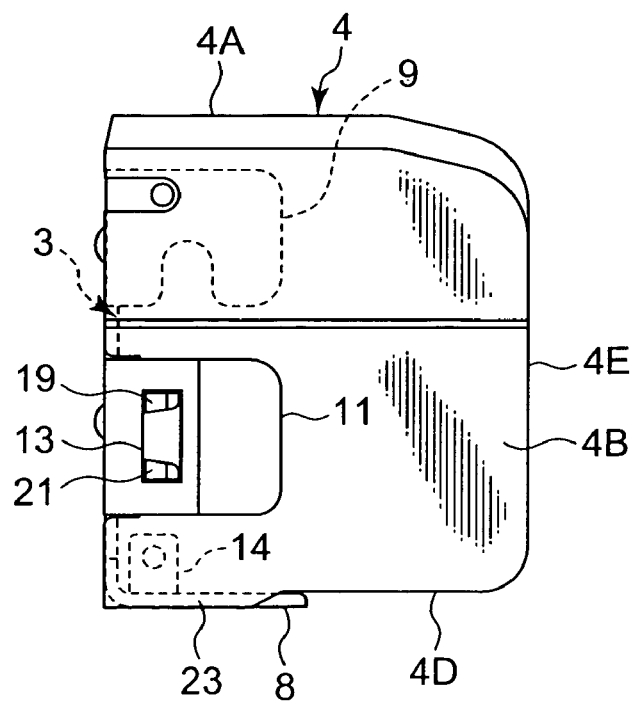
FIG. 10 is a side view showing that the terminal cover is attached to the terminal fence of FIG. 1.

The lead wires 33 are inserted into the lead wire drawing portion 22 in the state in which the terminal cover 4 is laid on the receiving piece 8 of the terminal fence 3. At this time, since the width of the lead wire drawing portion 22 on the opening side is enlarged, the lead wires 33 are also easily inserted. When the terminal cover 4 is slid toward the hermetically sealed vessel 6 in this state, the upper holding pieces 9, 9 enter the terminal cover 4 and are disposed in the insertion portions 18, 18 constituted in the upper right and left corners. On the other hand, the lower holding pieces 11, 11 are positioned outside the terminal cover 4. At this time, since the tips of the lower holding pieces 11, 11 are opened out, the terminal cover 4 does not abut on the tips. Moreover, in a final attaching position, the engaging protrusions 19, 19, 21, 21 of the terminal cover 4 detachably engage with upper and lower portions from the inside in the engagement holes 13, 13 of the lower holding pieces 11, 11 (FIGS. 1, 9, 14).

The terminal cover 4 is attached to the terminal fence 3 by the engagement of the engagement holes 13, 13 with the engaging protrusions 19, 19, 21, 21, and the terminal 2, overload relay 31, and starting relay 32 are covered in the terminal cover 4. At this time, the upper holding pieces 9, 9 of the terminal fence 3 enter the insertion portions 18, 18 in the upper right and left corners of the terminal cover 4, and abut on the inner right and left surfaces of the upper wall 4A and the inner upper end surfaces of the opposite side walls 4B, 4C in the terminal cover 4. The opposite side walls 4B, 4C are disposed opposite to the inner sides of the lower holding pieces 11, 11, and the right and left ends of the receiving piece 8 abut on the lower right and left surfaces of the bottom wall 4D of the terminal cover 4 and the inner surfaces of the attachment guide portions 23, 23.

Figure 11:
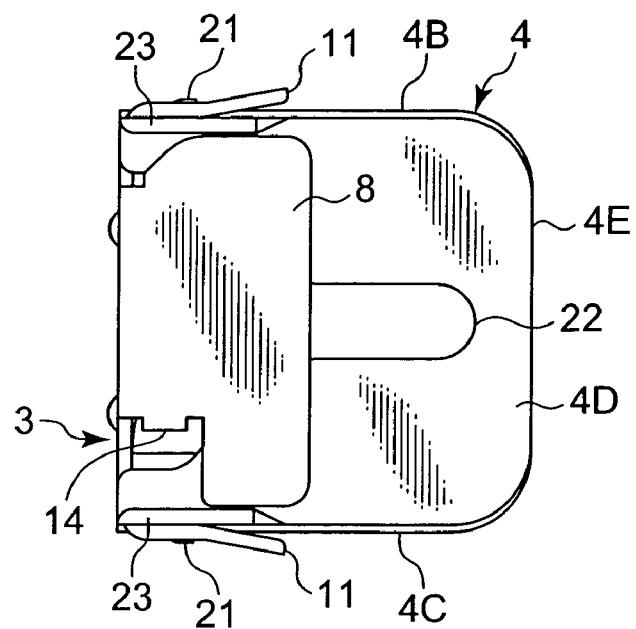
FIG. 11 is a bottom view showing that the terminal cover is attached to the terminal fence of FIG. 1.
Figure 14:
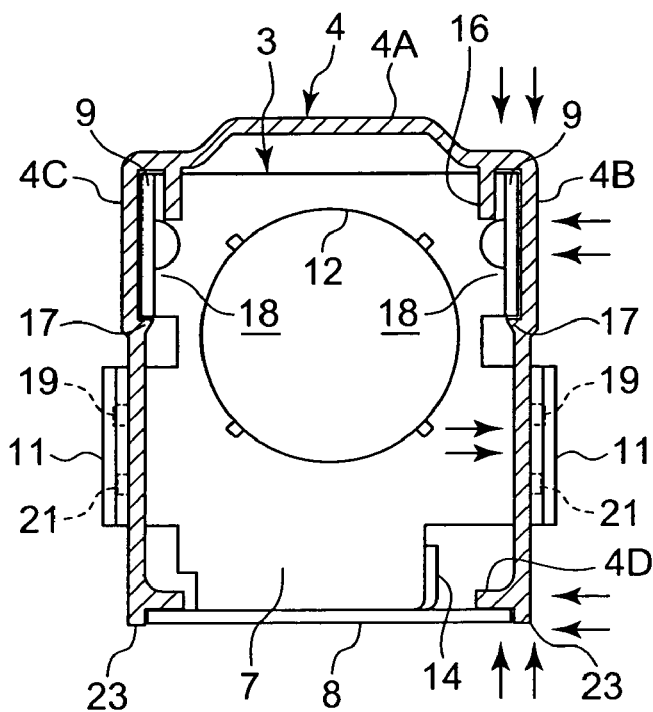
FIG. 14 is a longitudinal front view showing that the terminal cover is attached to the terminal fence of FIG. 1 excluding a terminal, an overload relay, and a starting relay.
Figure 17:
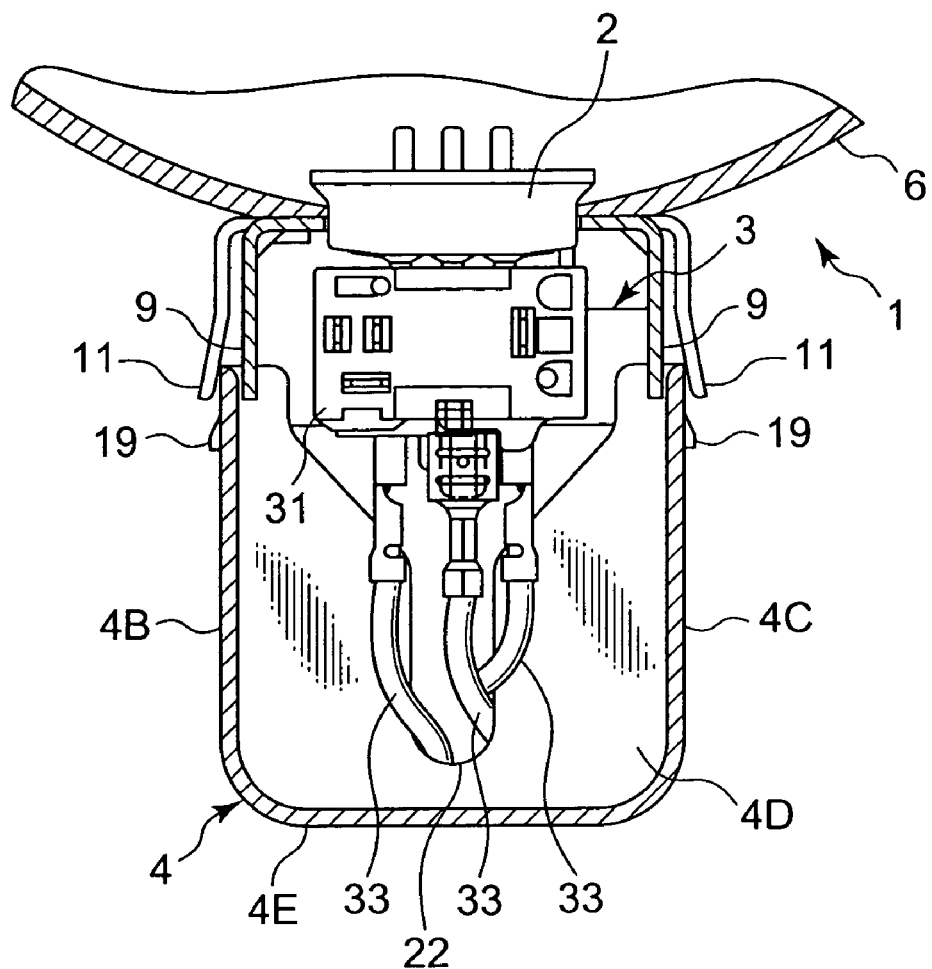
FIG. 17 is another flat sectional view showing the procedure for attaching the terminal cover to the terminal fence of FIG. 1.

Accordingly, since the upper, lower, and right and left surfaces of the terminal cover 4 are held by the terminal fence 3 as shown in FIG. 14, the terminal cover 4 is stably attached/held onto the terminal fence 3. The lead wires 33, 33 are collected and arranged in the inner portion of the gradually narrowed lead wire drawing portion 22 during the sliding of the terminal cover 4 toward the hermetically sealed vessel 6 (FIG. 17). Moreover, the broad portion (one portion) of the lead wire drawing portion 22 on the open side is covered with the receiving piece 8 (FIG. 11). Accordingly, it is possible to avoid a disadvantages that fingers contact a charging portion disposed inside via the lead wire drawing portion 22.

Moreover, an earth wire is attached to the earth terminal 14 of the terminal fence 3 via a screw 34, but the earth terminal 14 is positioned in the lower right corner in the terminal cover 4 with respect to the terminal fence 3, and this is an empty space where the overload relay 31 or the starting relay 32 is not disposed (FIGS. 12, 13). Since the empty space in the terminal cover 4 can be used to take an earth by the earth terminal 14, the terminal cover 4 can be miniaturized. Since the earth terminal 14 is integral with the terminal fence 3, the number of components can be reduced.

Figure 20:
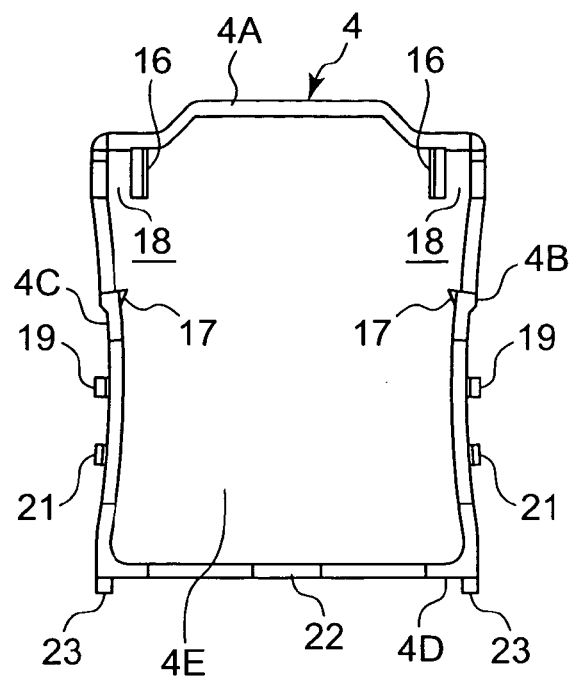
FIG. 20 is another front view of the terminal cover of FIG. 1.

Here, since the terminal cover 4 is molded by a hard synthetic resin, portions having longest dimensions in the vicinity of the middles of the opposite side walls 4B, 4C fall inwards as shown in FIG. 20 at the time of the molding. When the opposite side walls 4B, 4C fall in this manner, the engaging protrusions 19, 21 are detached from the engagement holes 13 of the terminal fence 3, and the engagement is impossible. However, in the present embodiment, the engaging protrusions 19, 19 in the vicinity of the middles are formed to be higher than the engaging protrusions 21 disposed below as described above. Therefore, even when the portions in the vicinity of the middles of the side walls 4B, 4C fall inwards at the time of the molding as described above, it is possible to securely engage the engaging protrusions 19, 19 with the engagement holes 13 of the holding pieces 11, 11 of the terminal fence 3. This also stabilizes an attached state.

Figure 21:
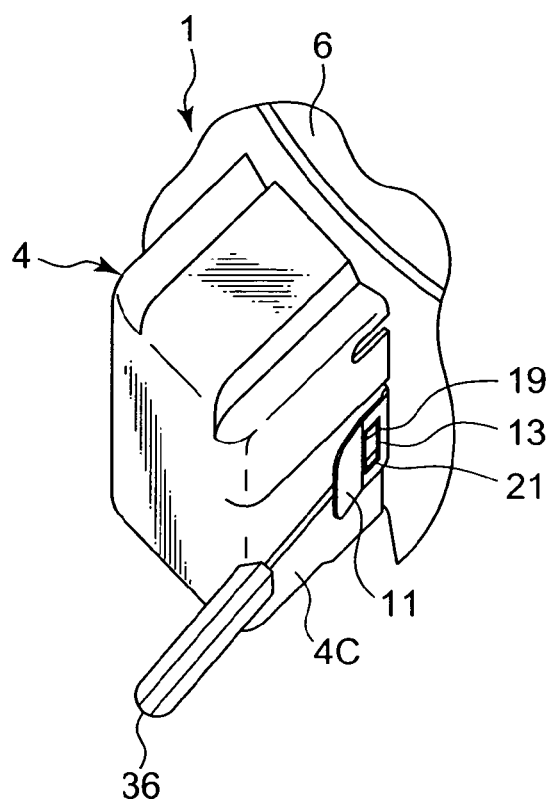
FIG. 21 is a perspective view showing a procedure for removing the terminal cover of FIG. 1.
Figure 22:
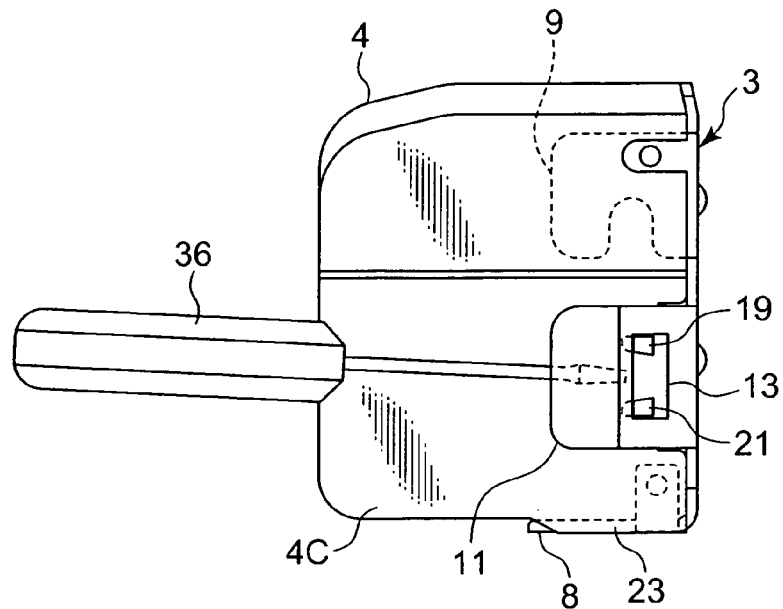
FIG. 22 is a side view showing the procedure for removing the terminal cover of FIG. 1.
Figure 23:
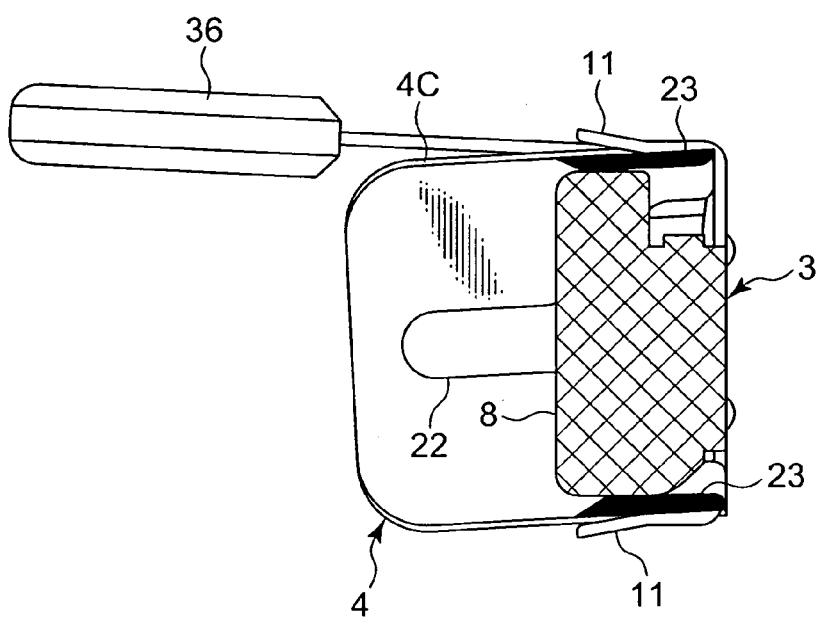
FIG. 23 is a bottom view showing the procedure for removing the terminal cover of FIG. 1.

Next, to remove the terminal cover 4 from the terminal fence 3 during maintenance or the like, tools such as a driver 36 are inserted between one lower holding piece 11 and the terminal cover 4, the tip of the driver is pushed inwards to deform, for example, the side wall 4C of the terminal cover 4 inwards as shown in FIGS. 21 to 23 so that the engaging protrusions 19, 21 are detached from the engagement hole 13. However, when the terminal cover 4 is vertically/horizontally held by the terminal fence 3 in the upper and lower right and left corners as described above, it is difficult to deform the wall and remove the cover.

Figure 24:
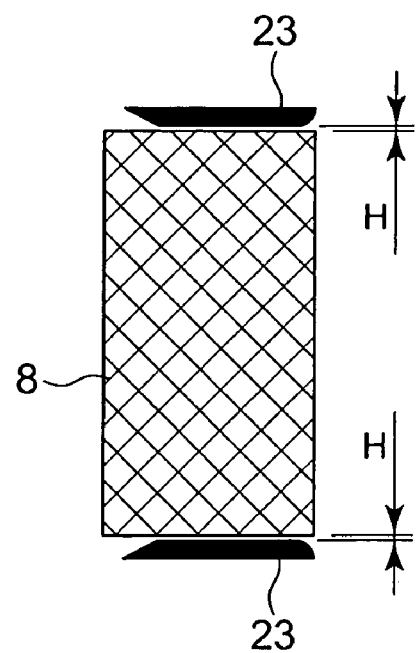
FIG. 24 is a diagram showing a comparative example of a receiving piece of the terminal fence.
Figure 25:
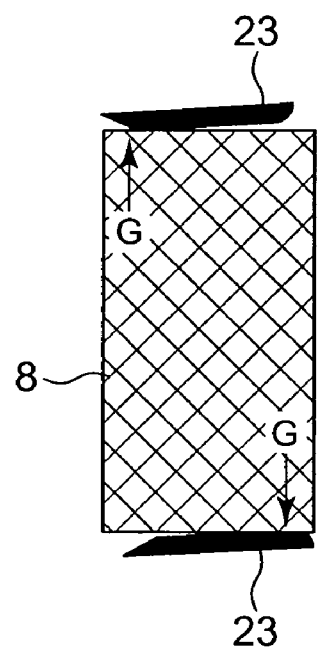
FIG. 25 is also a diagram showing the comparative example of the receiving piece of the terminal fence.

Here, small clearances H exist between the attachment guide portions 23, 23 of the terminal cover 4 and the receiving piece 8 of the terminal fence 3 as shown in FIG. 24. However, when the tip corners of the receiving piece 8 of the terminal fence 3 remain to be disposed at right angles as shown in FIG. 25, and when the cover is deformed with the driver as described above, the attachment guide portions 23, 23 of the terminal cover 4 contact the tip corners of the receiving piece 8 (FIG. 25G), and the terminal cover 4 is not easily detached from the terminal fence 3.

However, in the present embodiment, since the tip corners of the receiving piece 8 are formed in curved shapes, and the dimensions of the attachment guide portions 23, 23 are set to be shorter than the right and left surface dimensions of the receiving piece, the deformation of the terminal cover 4 at the time when the tip of the driver 36 is pushed inwards is not easily inhibited by the attachment guide portions 23 and receiving piece 8. This facilitates the removing operation.

As described above in detail, the present invention comprises: the terminal fence fixed to the outer surface of the hermetically sealed vessel so as to surround the terminal attached to the hermetically sealed vessel; and the terminal cover attached to the terminal fence so as to cover the terminal. The terminal cover has the shape of the substantially rectangular box and it is held on its upper or lower surface as well as right and left surfaces by the terminal fence. Therefore, the terminal cover can be held firmly and stably. The terminal cover has the shape of the substantially rectangular box, and is therefore easily molded and is also miniaturized.

Moreover, the terminal fence comprises a holding piece positioned on the opposite sides of the terminal to hold the terminal cover; and a receiving piece which is positioned below the terminal and on which the terminal cover is laid. Since the projecting dimension of the receiving piece from the hermetically sealed vessel is larger than that of the holding piece, the terminal cover is easily laid on the holding piece when attached to the terminal fence, and the attaching operation properties of the terminal cover are enhanced.

Furthermore, the holding piece comprises an engagement hole, and the terminal cover comprises a plurality of engaging protrusions which detachably engage with the engagement hole on opposite side surfaces. Moreover, the engaging protrusion positioned in the vicinity of the middle of the side surface of the terminal cover is formed to be higher than the other engaging protrusion. Therefore, even when the side surface of the terminal cover in the vicinity of the middle falls inwards at the time of the molding, the engaging protrusion can be engaged with/attached to the engagement hole of the holding piece of the terminal fence securely and stably.

Additionally, the terminal cover comprises attachment guide portions positioned on the opposite sides of the receiving piece, the tip corner portion of the receiving piece of the terminal fence is formed in a curved shape, and the dimension of the attachment guide portion is set to be shorter than the right/left surface dimension of the receiving piece. Therefore, when the terminal cover is removed from the terminal fence, the terminal cover can be deformed and detached easily.

Moreover, the terminal cover comprises a lead wire drawing portion. The lead wire drawing portion is cut out/formed so as to be gradually narrowed from an open side on a terminal fence side, and is partially covered with the terminal fence in a state in which the terminal cover is held by the terminal fence. Therefore, lead wires drawn out of the terminal cover are easily inserted via a broad opening in the lead wire drawing portion on the open side, and can be collected and arranged together in a narrow portion. Since the lead wire drawing portion is partially covered by the terminal fence, it is possible to avoid the disadvantage that the charging portion is touched by the fingers.

Furthermore, since the terminal fence integrally includes the earth terminal positioned in the empty space in the terminal cover, the empty space in the terminal cover can be used to take the earth, and the terminal cover is miniaturized. Moreover, since the earth terminal is integral with the terminal fence, the number of components can be reduced.

Additionally, since the compressor of the present invention is provided with the terminal cover of the terminal protective device of each invention described above, safety, and assembly and maintenance operation properties are enhanced.

Moreover, since the cold storage chamber of the present invention is provided with the compressor, the safety and the assembly and maintenance operation properties are similarly enhanced.

What is claimed is:

1. A terminal protective device for a compressor comprising:
    a terminal fence fixed to the outer surface of a hermetically sealed vessel so as to surround a terminal attached to the hermetically sealed vessel; and
    a terminal cover attached to the terminal fence so as to cover the terminal,
    wherein the terminal cover has the shape of a substantially rectangular box and it is held on its upper or lower surface as well as right and left surfaces by the terminal fence, and
    wherein the terminal fence comprises a holding piece positioned on the opposite sides of the terminal to hold the terminal cover, and a receiving piece which is positioned below the terminal and on which the terminal cover is laid, and the projecting dimension of the receiving piece from the hermetically sealed vessel is larger than that of the holding piece.

2. The terminal protective device for a compressor, according to claim 1 and wherein the terminal cover further comprises a lead wire drawing portion, and the lead wire drawing portion is cut out and formed so as to be gradually narrowed from an open side on a terminal fence side, and is partially covered with the terminal fence in a state in which the terminal cover is held by the terminal fence.

3. The terminal protective device for a compressor, according to claim 1 wherein the terminal cover is held on its upper or lower surface as well as right and left surfaces by the terminal fence and the terminal fence integrally includes an earth terminal positioned in an empty space in the terminal cover.

4. The terminal protective device for the compressor according to claim 1, wherein the holding piece comprises an engagement hole, and the terminal cover comprises a plurality of engaging protrusions which detachably engage with the engagement hole on opposite side surfaces, and
    the engaging protrusion positioned in the vicinity of the middle of the side surface of the terminal cover is set to be higher than the other engaging protrusion.

5. The terminal protective device for the compressor according to claim 4, wherein the terminal cover comprises attachment guide portions positioned on the opposite sides of the receiving piece, the tip corner portion of the receiving piece of the terminal fence is formed in a curved shape, and the dimension of the attachment guide portion is set to be smaller than the right/left surface dimension of the receiving piece.

* * * * *